(12) United States Patent
Takeda et al.

(10) Patent No.: US 10,309,365 B2
(45) Date of Patent: Jun. 4, 2019

(54) IGNITION DEVICE AND IGNITION SYSTEM

(71) Applicant: DENSO CORPORATION, Kariya, Aichi-pref. (JP)

(72) Inventors: Shunichi Takeda, Kariya (JP); Mitsunobu Niwa, Kariya (JP); Hisaharu Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 420 days.

(21) Appl. No.: 15/302,544

(22) PCT Filed: Apr. 9, 2015

(86) PCT No.: PCT/JP2015/061057
§ 371 (c)(1),
(2) Date: Oct. 7, 2016

(87) PCT Pub. No.: WO2015/156341
PCT Pub. Date: Oct. 15, 2015

(65) Prior Publication Data
US 2017/0022960 A1    Jan. 26, 2017

(30) Foreign Application Priority Data

Apr. 10, 2014 (JP) ................................ 2014-080623
Feb. 2, 2015 (JP) ................................ 2015-018696

(51) Int. Cl.
*F02P 3/05*    (2006.01)
*F02P 3/04*    (2006.01)
(Continued)

(52) U.S. Cl.
CPC ............... *F02P 3/05* (2013.01); *F02P 3/0442* (2013.01); *F02P 3/0846* (2013.01); *F02P 5/15* (2013.01);
(Continued)

(58) Field of Classification Search
CPC .......... F02P 3/05; F02P 3/0442; F02P 3/0846; F02P 5/15; F02P 9/007; F02P 17/12; F02P 3/0876
See application file for complete search history.

(56) References Cited

U.S. PATENT DOCUMENTS

| 5,571,245 A | 11/1996 | Ooyabu et al. |
| 2008/0127937 A1 | 6/2008 | Toriyama et al. |
| 2016/0084213 A1 | 3/2016 | Nakayama et al. |

FOREIGN PATENT DOCUMENTS

| JP | H07-229461 | 8/1995 |
| JP | 2000-170632 | 6/2000 |

(Continued)

*Primary Examiner* — Hieu T Vo
(74) *Attorney, Agent, or Firm* — Nixon & Vanderhye P.C.

(57) ABSTRACT

An ignition device includes a secondary current control circuit that receives a secondary current control signal IGa from an ECU, and a feedback circuit outputs a control signal for controlling energization of an primary coil to an energy supply circuit according to a result of comparison of a control value of the secondary current outputted from the secondary current control circuit and a detected value of the secondary current. Further, the ECU outputs a secondary current control signal IGa in accordance with engine parameters. Thereby, the secondary current substantially indicating the amount of energy that is supplied into the ignition coil from the energy supply circuit can be controlled in accordance with the operating condition of the engine. Therefore, it is possible to suppress excess or shortage of energy supplied from the energy supply circuit to an ignition coil from occurring.

7 Claims, 12 Drawing Sheets

(51) Int. Cl.
*F02P 3/08* (2006.01)
*F02P 5/15* (2006.01)
*F02P 9/00* (2006.01)
*F02P 17/12* (2006.01)

(52) U.S. Cl.
CPC ............... *F02P 9/007* (2013.01); *F02P 17/12* (2013.01); *F02P 3/0876* (2013.01); *Y02T 10/46* (2013.01)

(56) References Cited

FOREIGN PATENT DOCUMENTS

| | | | | |
|---|---|---|---|---|
| JP | 2009-052435 | 3/2009 | | |
| JP | 2015-200300 | 11/2015 | | |
| JP | 2015-206354 | 11/2015 | | |
| JP | 2015200249 A | * 11/2015 | ............... | F02P 3/00 |

* cited by examiner

| | SECONDDARY CURRENT COMMAND VALUE | | | |
|---|---|---|---|---|
| | 200mA | 150mA | 100mA | 50mA |
| L1 | Hi | Hi | Lo | Lo |
| L2 | Hi | Lo | Hi | Lo |

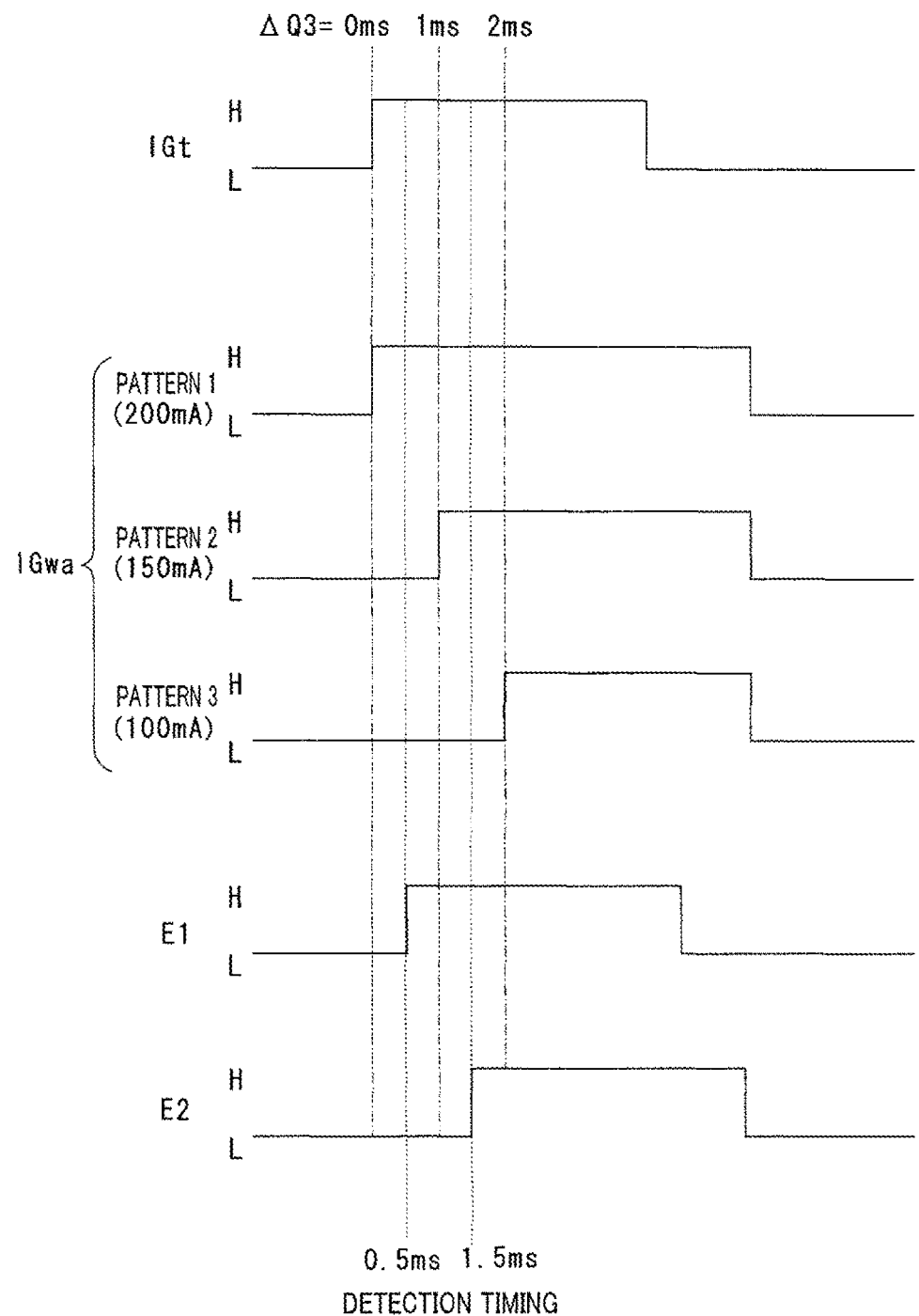

FIG.10(a)
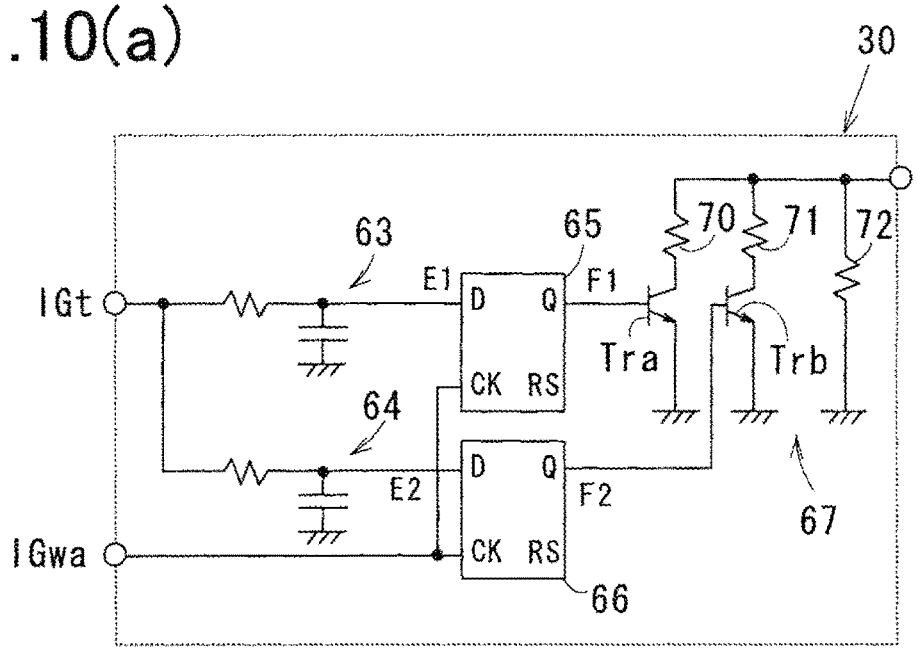
FIG.10(b)
| | Tra STATE | Trb STATE | SECONDARY CURRENT COMMAND VALUE |
|---|---|---|---|
| PATTERN 1 | OFF | OFF | 200mA |
| PATTERN 2 | ON | OFF | 150mA |
| PATTERN 3 | ON | ON | 100mA |
FIG.11
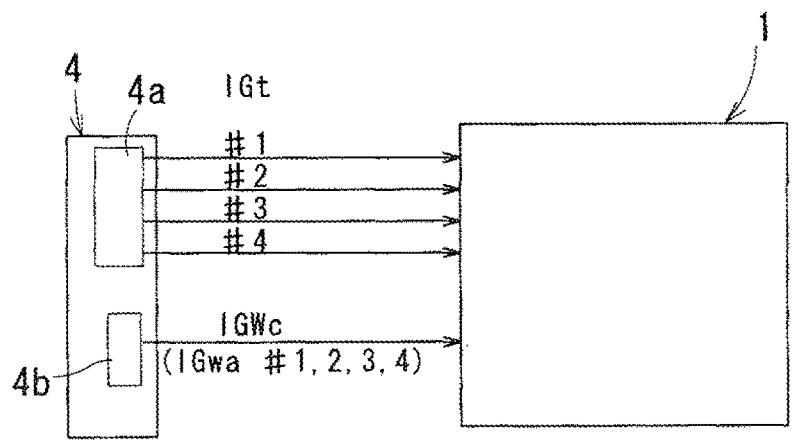

REFERENCE EXAMPLE

IGNITION DEVICE AND IGNITION SYSTEM

This application is the U.S. national phase of International Application No. PCT/JP2015/061057 filed 9 Apr. 2015 which designated the U.S. and claims priority to JP Patent Application No. 2014-080623 filed 10 Apr. 2014 and JP Patent Application No. 2015-018696 filed 2 Feb. 2015, the entire contents of each of which are hereby incorporated by reference.

TECHNICAL FIELD

The present invention relates to an ignition device and an ignition system used in an internal combustion engine.

BACKGROUND ART

There is an energy supply circuit as a technique to continue a spark discharge for reducing a burden of a spark plug while suppressing unnecessary power consumption. The energy supply circuit is intended to continue a spark discharge that has occurred as a spark discharge (hereinafter, referred to as a main ignition) for an arbitrary period of time by supplying an electric energy to a negative side of a primary coil before the main ignition initiated by a so-called full-transistor type ignition circuit disappears, and applying a secondary current which flows in the same direction as the main ignition continuously.

It should be noted that in the following, a spark discharge to be continued by the energy supply circuit, that is, a spark discharge following a main ignition is referred to as a continuous spark discharge. In addition, a period in which the continuous spark discharge continues is referred to as a spark discharge duration.

The energy supply circuit maintains the spark discharge by adjusting the secondary current by controlling the primary current during the spark discharge duration. Further, by adjusting the secondary current during the continuous spark discharge, a burden of the spark plug is reduced and unnecessary power is suppressed from consuming, thus it is possible to continuous spark discharge.

Next, for purposes of understanding the present invention, a typical example of an energy supply circuit to which the present invention is not applied will be described with reference to FIG. 14.

An ignition device 100 shown in FIG. 14 includes a main ignition circuit 102 that generates a main ignition based on a full transistor to an ignition plug 101, and an energy supply circuit 103 that generates a continuous spark discharge by continuing the same polarity on the main ignition.

The main ignition circuit 102 causes a primary coil 106 to accumulate magnetic energy by passing a positive primary current from an on-vehicle battery 105 to the primary coil 106 by turning a switching element 104 on, then, by turning the switching element 104 off, causing a high voltage in the secondary coil 107 by converting the magnetic energy into an electrical energy using electromagnetic induction, thus causing the main ignition. Moreover, the energy supply circuit 103 accumulates a voltage of the on-vehicle battery 105 boosted by a booster circuit 108 in a capacitor 109, and the electrical energy accumulated in the capacitor 109 is supplied into a negative side of the primary coil 106 by turning on-off the switching element 110.

Furthermore, the ignition device 100 shown in FIG. 14 includes a feedback circuit 111 that detects the secondary current and feedbacks the secondary current to the energy supply circuit 103, and the feedback circuit 111 feedbacks the detected secondary current to a driver circuit of the energy supply circuit 103.

Here, in the feedback circuit 111, upper and lower thresholds for the secondary current is set, for example, and a feedback signal composed according to the comparison between a detection value and the upper and lower thresholds is outputted to the energy supply circuit 103.

In a case where the continuous spark discharge is continued by the energy supply circuit, it is preferable that an amount of the energy supplied is controllable in accordance with an operating condition of an engine. In other words, when a gas flow rate is high in a cylinder (at the time the engine is running at high speed), it is necessary to supply a large amount of energy in a short period of time for the continuous discharge, and when the gas flow rate is low in the cylinder (at the time the engine is running at low speed), it is preferable to supply only a small amount of energy over a long period of time for increasing ignition opportunities. Therefore, when it is impossible to control the energy supplying amount, there is a possibility that not enough energy will be available when it is necessary to supply the high energy in a short period of time, or the power consumption may become unnecessarily large when it is preferable to supply the low energy over a long period of time, for example.

It should be noted that in a conventional ignition device without an energy supply circuit, a multiple discharge repeatedly generating the main ignition based on the full transistor by a circuit equivalent to the main ignition circuit as a technique to continuous spark discharge is known. Then, the conventional ignition device that performs the multiple discharge controls energization of the primary coil based on control signals (ignition signal IGt and discharge continuation signal IGw) given from an ECU (abbreviation of Engine Control Unit) that constitutes a core of an engine control. Here, the ignition signal IGt is a signal for controlling a start time of the multiple discharges, and the discharge continuation signal IGw is a signal for controlling the duration of the multiple discharge (refer to Patent Documents 1 and 2, for example).

However, when supplying the energy by the energy supply circuit as described above, and when the ignition signal IGt and the discharge continuation signal IGw similar to the conventional technology are used, although it is possible to control a supplying period of the energy by the discharge continuation signal IGw, it is impossible to control a supplied amount of the energy. Therefore, there is a possibility that the amount of energy becomes short when it is necessary to supply the high energy in a short period of time, or the power consumption may become unnecessarily large when supplying the low energy over a long period of time.

PRIOR ART

Patent Document

[Patent Document 1] Japanese Patent Application Laid-Open Publication No. 2008-138639
[Patent Document 2] Japanese Patent Application Laid-Open Publication No. 2009-052435

DISCLOSURE OF THE INVENTION

Problems to be Solved by the Invention

The present invention has been made in light of the problems set forth above and has as its object to provide an ignition device that performs the continuous spark discharge for an internal combustion engine that suppresses excess or shortage in an amount of energy supplied from an energy supply circuit to an ignition coil from occurring.

Means for Solving the Problems

In an ignition device according to a first aspect, the ignition device is for an internal combustion engine, and includes a main ignition circuit, an energy supply circuit, a feedback circuit, and a secondary current control circuit.

The main ignition circuit generates a spark discharge to a spark plug by controlling energization of a primary coil of an ignition coil. Further, the energy supply circuit continues a spark discharge started by an operation of the main ignition circuit by controlling the energization of the primary coil during the spark discharge started by the operation of the main ignition circuit to supply a secondary current in the same direction as a main ignition continuously in a secondary coil of the ignition coil. Moreover, the feedback circuit detects the secondary current and feeds back the secondary current to the energy supply circuit. Furthermore, the secondary current control circuit receives a secondary current control signal indicating a control value of the secondary current from a separate control unit Further, the control value of the secondary current is obtained in accordance with engine parameters indicating an operating condition of the internal combustion engine. Then, the feedback circuit outputs the control signal for controlling the energization of the primary coil to the energy supply circuit according to a result of comparison between the control value of the secondary current outputted from the secondary current control circuit and a detected value of the secondary current.

Thereby, the secondary current substantially indicating the amount of energy that is supplied can be controlled in accordance with the operating condition of the internal combustion engine. Therefore, it is possible to suppress excess or shortage of energy supplied from the energy supply circuit to the ignition coil from occurring in the ignition device for the internal combustion engine that performs the continuous spark discharge.

In the ignition device according to a second aspect, a discharge continuation signal for operating the energy supply circuit is outputted from the control unit to the ignition device, and the energy supply circuit controls the energization of the primary coil during the discharge continuation signal is being inputted. Then, the secondary current control signal and the discharge continuation signal are respectively outputted from the control unit to the ignition device by separate signal lines.

Accordingly, when giving the control value of the secondary current from the separate control unit to the ignition device, it is possible to simplify the circuit configuration.

In the ignition device according to a third aspect, the secondary current control signal is outputted from the control unit to the ignition device by using a signal line. Then, the secondary current control circuit obtains the control value of the secondary current according to a potential of the signal line Thus, when using a plurality of signal lines, different numerical values for each combination of high/low levels of the signal lines can be set as a control value of the secondary current. Therefore, it is possible to increase the degree of freedom in selecting the control value of the secondary current.

Further, when using only one signal line, one numerical value can be selected from two numerical values as the control value of the secondary current via the high/low of one signal line. Therefore, if it is possible to sufficiently suppress the excess or shortage of the amount of energy in the continuous spark discharge from occurring when the two numerical values as the control values of the secondary current are prepared, the ignition device can obtain the control value of the secondary current from only one signal line.

In the ignition device according to a fourth aspect, the secondary current control signal is indicated as an analog voltage signal.

Thus, the control value of the secondary current is given as sequential numbers. Therefore, the ignition device is possible to control in accordance with the operating condition of the internal combustion engine more.

In an ignition system according to a first aspect, a control unit includes an ignition signal transmission unit that transmits an ignition signal as a pulse signal for operating a main ignition circuit to the ignition device, and a composite signal transmission unit that generates a composite signal including a discharge continuation signal and a secondary current control signal, and transmits it to the ignition device.

The composite signal IGwa is a pulse signal that rises simultaneously with or with a delay from a rising timing P1 of the ignition signal IGt, the composite signal IGwa indicates a control value of a secondary current by a time difference between a rising timing Pa of the composite signal IGwa and the rising timing P1 of the ignition signal IGt, and a period with a timing P3 after a predetermined time from a falling timing P2 of the ignition signal IGt as a start timing and a falling timing P4 of the composite signal IGwa as an end time is indicated as a period to continue the continuous spark discharge.

Thus, it is possible to reduce the number of signal lines between the control unit and the ignition device.

In the ignition system according to a second aspect, the composite signal transmitting section multiplexes the composite signal of at least two cylinders of each cylinder and transmits it to the ignition device.

Thus, it is possible to further reduce the number of signal lines between the control unit and the ignition device.

BRIEF DESCRIPTION OF THE DRAWINGS

FIG. 9 shows a time chart showing the ignition signal IGt, the composite signal IGwa, a signal E1, and a signal E2 (third embodiment);

FIG. 10(a) shows a block diagram of a secondary current control circuit (third embodiment);

FIG. 10(b) shows a table showing a correspondence between an operation of the secondary current control circuit and a secondary current control value (third embodiment);

FIG. 11 shows a schematic diagram of an ignition system (fourth embodiment);

MODE FOR CARRYING OUT THE INVENTION

Figure 1:
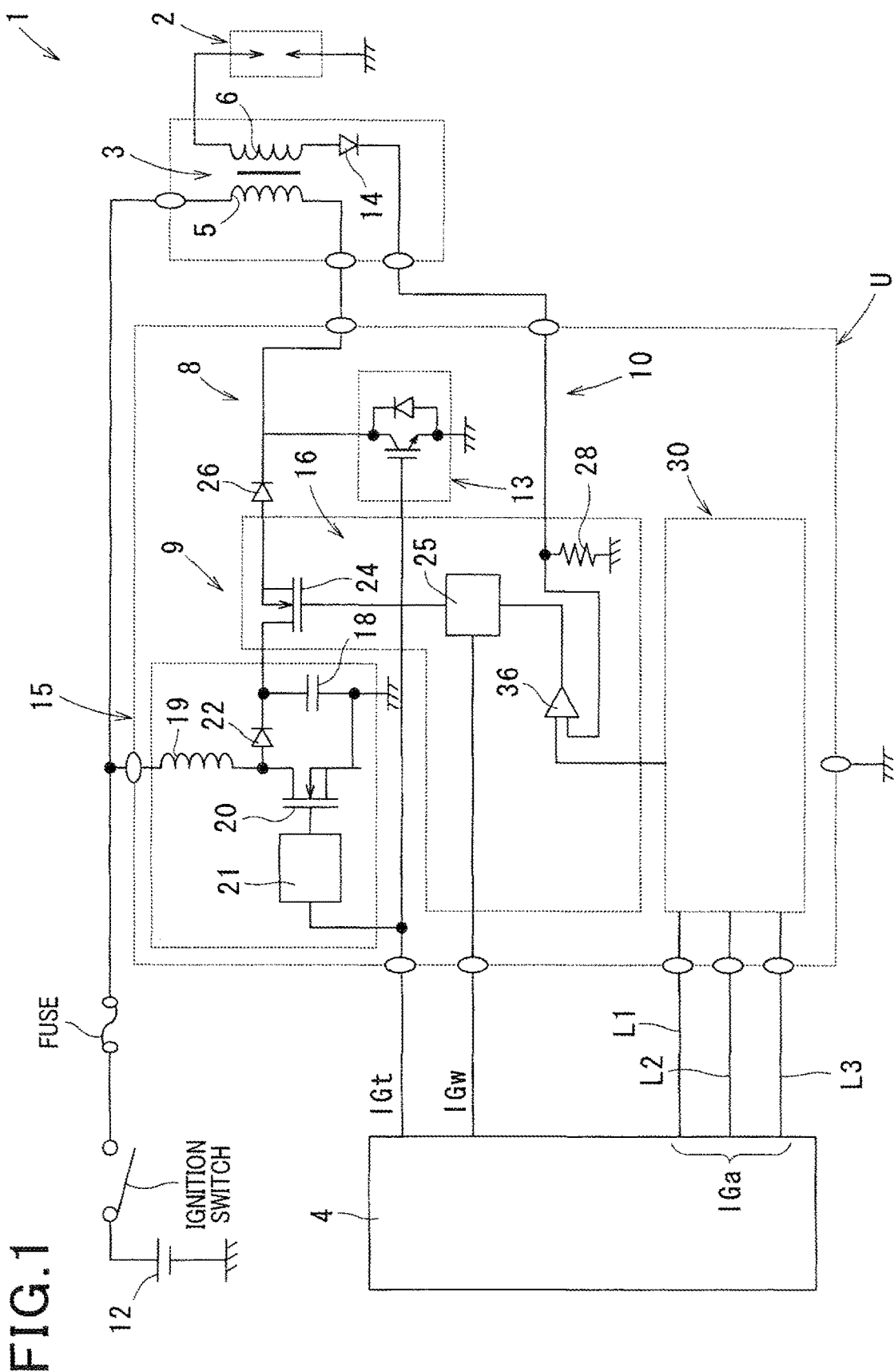
FIG. 1 shows a block diagram of an ignition device (first embodiment)

Hereinafter, modes for carrying out the invention are described with reference to embodiments. It should be noted that embodiments are given to disclose a specific example, and needless to say that the present invention is not limited to the embodiments.

EMBODIMENTS

Configuration of First Embodiment

An ignition device 1 of a first embodiment will be described with reference to FIG. 1, FIG. 2(a) and FIG. 2(b).

The ignition device 1 is intended to be mounted on a spark ignition engine for moving a vehicle, and ignites an air-fuel mixture in a combustion chamber at a predetermined ignition timing. It should be noted that one example of such an engine is a direct injection engine capable of lean burn using gasoline as fuel, equipped with a swirl flow control means for creating a swirling flow of the air-fuel mixture such as tumble flow or swirl flow in a cylinder. Then, in an operating state of having a possibility of blowout of spark discharge due to a high gas flow rate in the cylinder such as a lean burn, the ignition device 1 is controlled to perform a continuous spark discharge following a main ignition.

In addition, the ignition device 1 is a DI (Direct Ignition) type that uses an ignition coil 3 corresponding to each spark plug 2 of each cylinder.

Furthermore, the ignition device 1 is intended to control energization of a primary coil 5 of the ignition coil 3 based on signals such as an ignition signal IGt and a discharge continuation signal IGw given from an electronic control unit (hereinafter, referred to as ECU 4.) that constitutes a core of an engine control, and the spark discharge of the spark plug 2 is controlled by operating an electric energy generated in the secondary coil 6 of the ignition coil 3 by controlling energization of the primary coil 5.

Here, signals from various sensors mounted in the vehicle for detecting parameters indicating the operating state and a control state of the engine (a warming up state, an engine speed, an engine load, a presence or absence of the lean burn, a degree of the swirling flow, or the like) is inputted to the ECU 4. Further, the ECU 4 is configured to include an input circuit for processing the inputted signals, a CPU for performing control processing and calculation processing related to an engine control based on the inputted signal, various memories for memorizing and storing data and programs required for the engine control, an output circuit for outputting a signal required for engine control based on processed results of the CPU, and the like. Then, the ECU 4 generates and outputs the ignition signal IGt and the discharge continuation signal IGw according to the engine parameters acquired from various sensors.

The ignition device 1 of the first embodiment is configured to include a main ignition circuit 8 for generating the main ignition based on a full transistor, an energy supply circuit 9 for continuing the spark discharge generated as the main ignition as the continuous spark discharge by an additional supplying of the electrical energy, and a feedback circuit 10 for detecting a secondary current and feeding it back to the energy supply circuit 9.

It should be noted that the main ignition circuit 8, the energy supply circuit 9, and the feedback circuit 10 are accommodated in a single case as an ignition circuit unit U, and the spark plug 2, the ignition coil 3 and the ignition circuit unit U are prepared with the same number as the number of cylinders, and are provided in each cylinder.

The spark plug 2 is that having a known structure including a center electrode connected to one end of the secondary coil 6 and a ground electrode that is grounded via a cylinder head of the engine, and the spark plug 2 generates the spark discharge between the center electrode and the ground electrode by the electric energy generated in the secondary coil 6.

The ignition coil 3 has the primary coil 5 and the secondary coil 6, and is a well-known structure that generates a current (secondary current) in the secondary coil 6 by electromagnetic induction in accordance with an increase and decrease of a current (primary current) flowing through the primary coil 5.

A first end of the primary coil 5 is connected to a positive electrode of an on-vehicle battery 12 through an ignition switch or the like, and a second end of the primary coil 5 is grounded via an ignition switch unit 13 of the main ignition circuit 8. Further, the energy supply circuit 9 is connected to the second end of the primary coil 5 in parallel with a line to be grounded via the ignition switch unit 13.

A first end of the secondary coil 6 is connected to the center electrode of the spark plug 2, as described above, and the second end of the secondary coil 6 is connected to the feedback circuit 10. Note that the second end of the secondary coil 6 is connected to the feedback circuit 10 via a first diode 14 that limits a direction of the secondary current in one direction.

The main ignition circuit 8 causes the primary coil 5 to accumulate energy by the switching on-off of the ignition switch unit 13, while it causes the secondary coil 6 to generate a high voltage by using the energy accumulated in the primary coil 5, thus causing the main ignition from the ignition plug 2.

More specifically, the main ignition circuit 8 has the ignition switching unit 13 for intermitting an energized state of the primary coil 5. The main ignition circuit 8 applies a positive primary current to the primary coil by applying a voltage of the on-vehicle battery 12 by turning the ignition switch unit 13 on during a period when the ignition signal IGt is given from ECU 4 to cause the primary coil 5 to accumulate the magnetic energy. Thereafter, the main ignition circuit 8 causes the main ignition to be generated by turning the ignition switch unit 13 off to generate a high voltage in the secondary coil 6 by converting the magnetic energy into the electric energy by the electromagnetic induction.

It should be noted that the ignition switch unit 13 is a power transistor (for example, an insulated gate bipolar transistors, MOS transistors), a thyristor, or the like. In addition, the ignition signal IGt is a signal for controlling the duration of accumulating the magnetic energy and an 3o ignition start timing to the primary coil 5 in the main ignition circuit 8.

The energy supply circuit 9 is configured to include the following booster circuit 15 and a supplied energy control unit 16.

First, the booster circuit 15 boosts the voltage of the on-vehicle battery 12 during a period in which the ignition signal IGt is given from the ECU 4, and causes the capacitor 18 to accumulate the boosted voltage.

Then, the charged energy control unit 16 supplies the electrical energy accumulated in the capacitor 18 to the negative side (ground side) of the primary coil 5.

The booster circuit 15 is configured to include a choke coil 19, a boost switching unit 20, a boost driver circuit 21, and a second diode 22 in addition to the capacitor 18. Note that the boost switching unit 20 is, for example, a MOS type transistor.

Here, one end of the choke coil 19 is connected to the positive electrode of the on-vehicle battery 12, and an energized state of the choke coil 19 is intermitted by the boost switching unit 20. Further, the boost driver circuit 21 is for turning on and off the boost switching unit 20 by sending a control signal to the boost switching unit 20, and by the on-off operation of the boost switching unit 20, the magnetic energy accumulated in the choke coil 19 is supplied in the capacitor 18 as the electrical energy.

It should be noted that the boost driver circuit 21 is configured so as to turn on and off repeatedly the boost switching unit 20 at predetermined intervals during a period in which the ignition signal IGt is given from the ECU 4.

Further, the second diode 22 is for preventing the electrical energy accumulated in the capacitor 18 from flowing back to the choke coil 19 side.

The supplied energy control unit 16 is configured to include the following supply switching unit 24, a supply driver circuit 25, and a third diode 26. Note that the supply switching unit 24 is, for example, a MOS type transistor.

Here, the supply switching unit 24 is turned on and off causing the electrical energy accumulated in the capacitor 18 to be supplied from the negative side to the primary coil 5, and the supply driver circuit 25 supplies a control signal to the supply switching unit 24 to be turned on and off.

Then, the supply driver circuit 25 maintains the secondary current to a controlled value in the period in which the discharge continuation signal IGw is given by controlling the electrical energy supplied from the capacitor 18 to the primary coil 5 by turning on and off the supply switching unit 24. Here, the discharge continuation signal IGw is a signal for controlling the duration of continuing the continuous spark discharge, more specifically, it is a signal that instructs the supply switching unit 24 to repeat switching on and off to control the period to supply the electrical energy from the booster circuit 15 to the primary coil 5.

Note that the third diode 26 is for preventing the current from the primary coil 5 to the capacitor 18 from flowing reversely.

The feedback circuit 10 detects the secondary current and feeds it back to the supplied energy control unit 16 of the energy supply circuit 9.

Here, a secondary current detection resistor 28 for detecting the secondary current is provided in the feedback circuit 10, and a detection value of the secondary current is outputted after being converted into a voltage by the secondary current detection resistor 28.

Next, a characteristic part of a configuration of the first embodiment will be described.

The ignition device 1 includes a secondary current control circuit 30 that receives the input of the secondary current control signal IGa indicating a control value of the secondary current from the ECU 4. It should be noted that although the secondary current control circuit 30 of the first embodiment is provided for each cylinder and is included in the ignition circuit unit U, it may be provided only one in common for all the cylinders separated from the ignition circuit unit U.

Here, as shown in FIG. 1, the secondary current control signal IGa is outputted from the ECU 4 to the ignition device 1 by three signal lines L1 to L3 other than signal lines for outputting the ignition signal IGt and the discharge continuation signal IGw. Further, the ECU 4 acquires the engine parameters indicating the operating condition of the internal combustion engine from the various sensors and obtains the control value of the secondary current according to the engine parameters, and composes and outputs the secondary current signal IGa.

At this time, the ECU 4 selects one numeric value from a plurality of preset numeric values as a control value of the secondary current according to the engine parameters. Further, the ECU 4 sets aspects of the secondary current control signal IGa corresponding to each numeric value by a combination of potentials (high/low) of the signal lines L1 to L3.

Figures 2A, 2B:
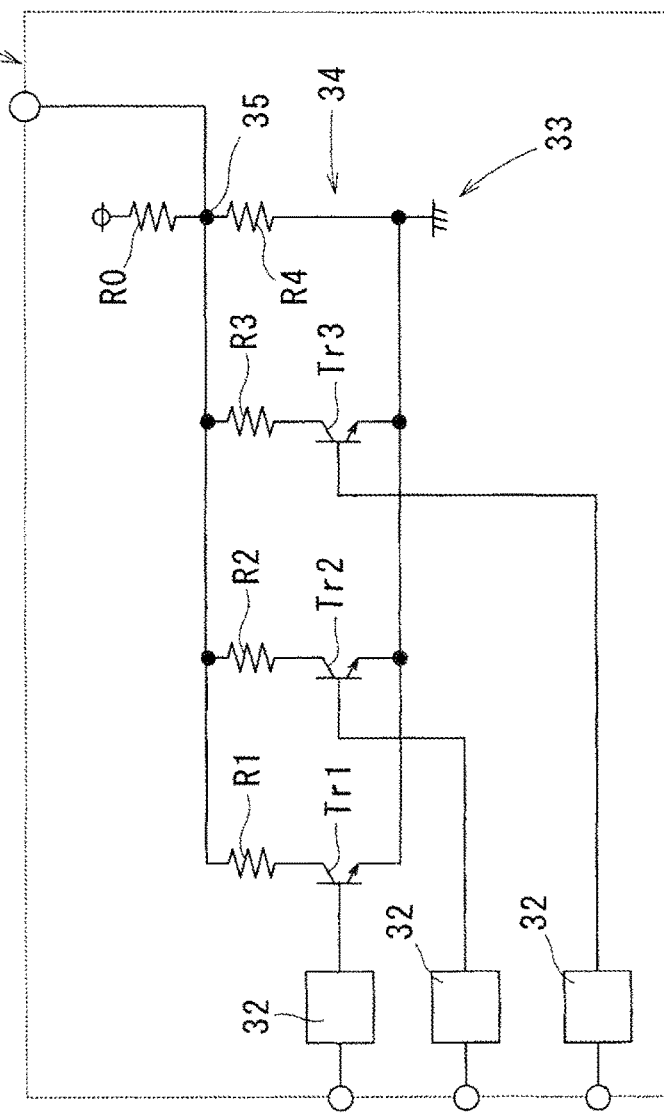
FIG. 2(a) shows a block diagram of a secondary current control circuit (first embodiment)
FIG. 2(b) shows a table illustrating aspects of a secondary current control signal (first embodiment)

For example, it is assumed that the ECU 4 sets three numeric values of 100 mA, 150 mA, and 200 mA as the control values of the secondary current (refer to FIG. 2(b)). In this case, if 200 mA is selected as a control value of the secondary current, the aspects of the secondary current control signal IGa are assumed to be set to, for example, the signal line L1: low, the signal line L2: low, and the signal line L3: low. Further, if 150 mA is selected, they are assumed to be set to: the signal line L1: high, the signal line L2: low, and the signal lines L3: low. Furthermore, if 100 mA is selected, they are assumed to be set to: the signal line L1: high, the signal line L2: high, and the signal line L3: low.

Further, the secondary current control circuit 30 includes three waveform shaping sections 32 to remove noise from each of a logic signal of the signal lines L1 to L3, and a control value output section 33 that outputs the potentials corresponding to the aspects of the secondary current control signal IGa (refer to FIG. 2(a)). Here, the control value output section 33 is composed of one resistor R0 and a parallel section 34 formed by four resistors R1 to R4 parallel with each other in series, and the potentials at a connection portion 35 of the resistor R0 and the parallel section 34 are outputted as the control value.

In other words, among four branches provided in parallel in the parallel section 34, switching elements Tr1 to Tr3 are incorporated respectively to the branches to which the resistors R1 to R3 are incorporated. Further, the switching elements Tr1 to Tr3 are incorporated into the respective resistors R1 to R3 in series. In addition, the switching elements Tr1 to Tr3 are bipolar transistors, for example. Then, high/low levels of the signal lines L1 to L3 are inputted to each of bases of the switching elements Tr1 to Tr3 without being logically converted, and the switching element Tr1 to Tr3 are turned on and off according to the high/low levels of the signal lines L1 to L3.

Thereby, since a combined resistance in the parallel section 34 changes between the three numeric values in accordance with the high/low levels of the signal lines L1 to L3, the potentials at the connection portion 35 also change between the three numeric values in accordance with the high/low levels of the signal lines L1 to L3. Therefore, the secondary current control circuit 30 is able to output the control value of the secondary current selected from among 200 mA, 150 mA, and 100 mA in accordance with the aspects of the secondary current control signals IGa.

Further, a comparator 36 is disposed in the feedback circuit 10 (refer to FIG. 1), and a control value of the secondary current shown as the potential of the connection portion 35 and a detection value of the secondary current converted to a voltage by the secondary current detection resistor are inputted into the comparator 36. Then, the comparator 36 outputs a signal corresponding to a comparison result between the control value and the detection value to the supply driver circuit 25, and the supply driver circuit 25 turns on and off the supply switching unit 24 based on the signal outputted from the comparator 36.

Next, an operation of the ignition device 1 will be described with reference to FIG. 3.

Figure 3:
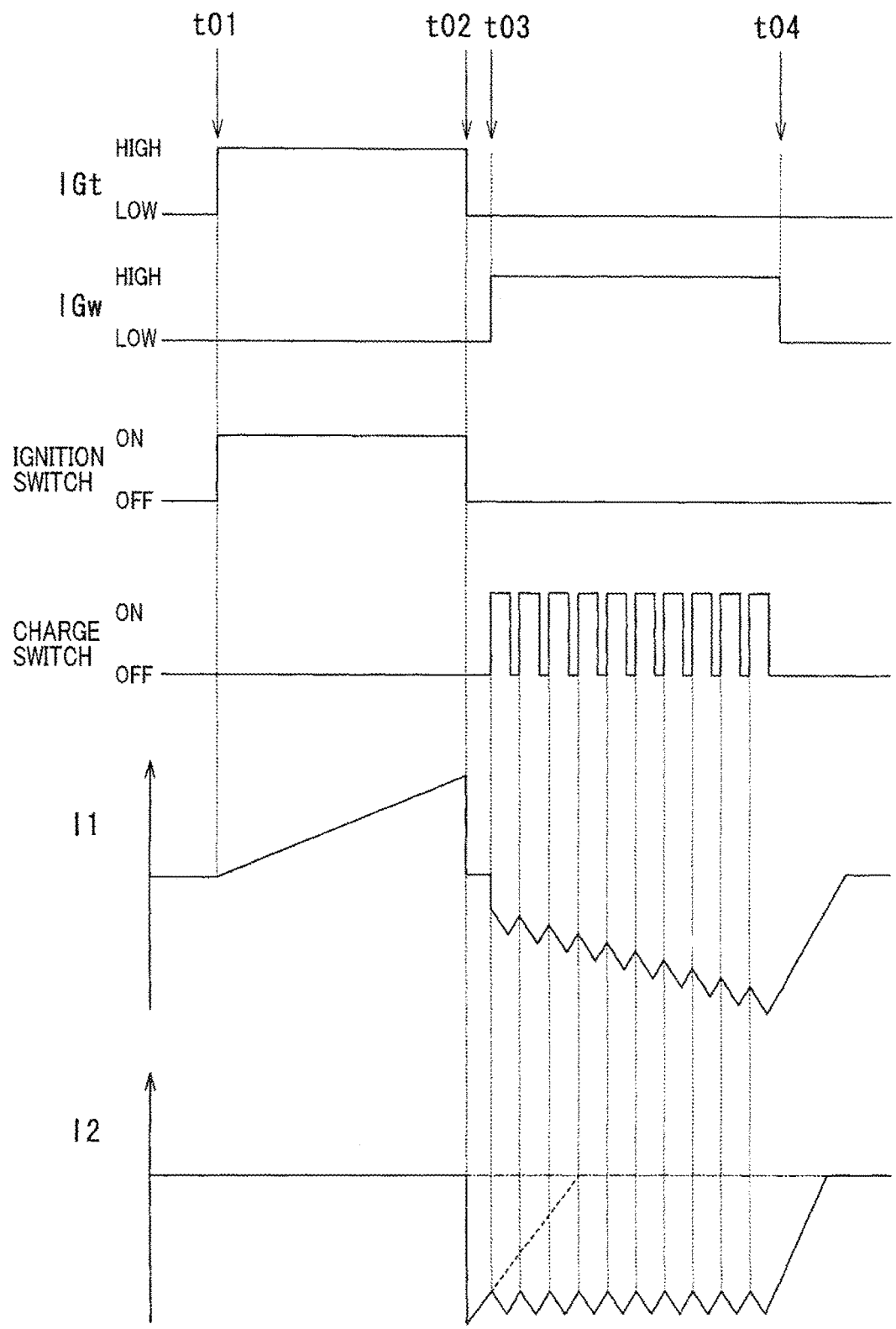
FIG. 3 shows a time chart showing an operation of the ignition device (first embodiment)

In FIG. 3, IGt is intended to represent an input state of the ignition signal IGt by high/low, and IGw is intended to represent an input state of the discharge continuation signal IGw by high/low. Further, an ignition switch and a supply switch represents the on-off of the ignition switching unit 13 and the supply switching unit 24, respectively, I1 represents the primary current (a current value flowing through the primary coil 5), and I2 represents the secondary current (a current flowing through the secondary coil 6).

When the ignition signal IGt is switched from low to high (refer to time t01), the ignition switching unit 13 maintains the on-state and the positive primary current flows during a period when the ignition signal IGt is high, and the magnetic energy is accumulated in the primary coil 5. Further, the boost switching unit 20 repeats on and off to perform a boosting operation, and the boosted electric energy is accumulated in the capacitor 18.

Eventually, when the ignition signal IGt is switched from high to low (refer to time t02), the ignition switch unit 13 is turned off, and the energization of the primary coil 5 is cut off abruptly. Accordingly, the magnetic energy accumulated in the primary coil 5 is converted into electric energy and the high voltage is generated in the secondary coil 6, thus the main ignition is started in the spark plug 2.

After the main ignition has started in the spark plug 2, the secondary current is attenuated at a substantially triangular waveform (refer to a dotted line of I2). Then, before the secondary current reaches the threshold of the lower limit, the discharge continuation signal IGw is switched from low to high (refer to time t03).

When the discharge continuation signal IGw is switched from low to high, the supply switching unit 24 is on-off controlled, and the electrical energy accumulated in the capacitor 18 is sequentially supplied into the negative side of the primary coil 5, thus the primary current flows from the primary coil 5 to the positive electrode of the on-vehicle battery 12. More specifically, every time the supply switching unit 24 is turned on, the primary current from the primary coil 5 to the positive electrode of the on-vehicle battery 12 is added, and the primary current increases to the negative side (refer to time t03 to t04.).

Then, every time the primary current is added, a secondary current in the same direction with the secondary current caused by the main ignition is sequentially added to the secondary coil 6, and the secondary current is changed to substantially match with the control value.

Thereby, the secondary current flows continuously enough to maintain the spark discharge by turning on and off the supply switching unit 24. As a result, when the on state of the discharge continuation signal IGw remains, the continuous spark discharge is maintained in the spark plug 2.

Here, the energization control of the primary coil 5 by the energy supply circuit 9 is performed substantially based on the secondary current that indicates the energy supplying amount and an energy supplying period. Then, the ECU4 controls the energy supplying amount and the energy supplying period by the energy supply circuit 9 by outputting the discharge continuation signal IGw and the secondary current control signal IGa to the ignition device 1.

Further, the ECU 4 sets the control value of the secondary current corresponding to the energy supplying amount and the control value of the energy supplying period according to the engine parameters (that is, according to the operating condition of the engine). Here, when the gas flow rate is high in the cylinder (at the time the engine is running at high speed), it is necessary to supply a large amount of energy in a short period of time for the continuous discharge, and when the gas flow rate is low in the cylinder (at the time the engine is running at low speed), it is preferable to supply only a small amount of energy over a long period of time for increasing ignition opportunities.

Figure 4A:
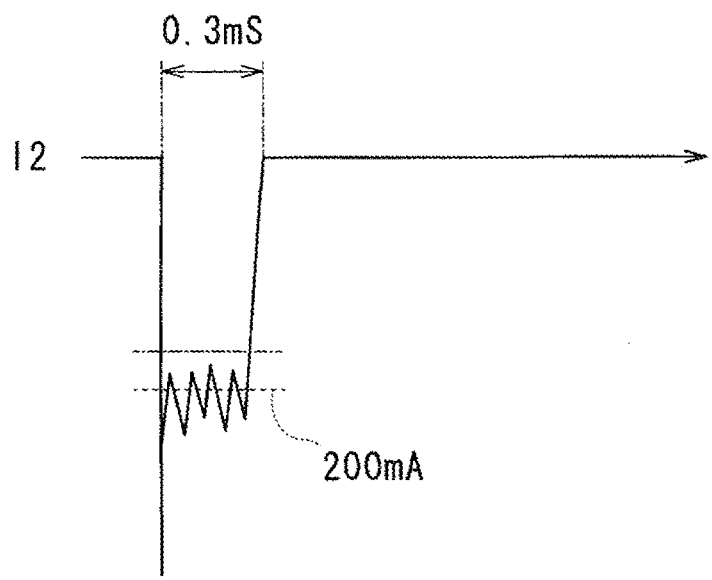
FIG. 4(a) shows a time chart showing a transition of a secondary current when it is necessary to supply a high energy in a short period of time (first embodiment)
Figure 4B:
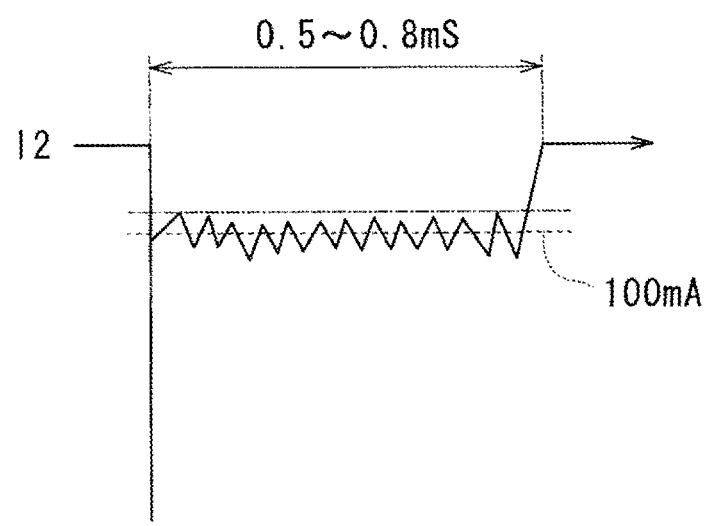
FIG. 4(b) shows a time chart showing a transition of the secondary current when supplying a low energy over a long period of time (first embodiment)

Therefore, as shown in FIG. 4 (*a*) and FIG. 4 (*b*), the control value of the secondary current is set to 200 mA and the energy supplying period is set to 0.3 mS in a high speed side (refer to FIG. 4 (*a*)), while the control value of the secondary current is set to 100 mA and the energy supplying period is set to 0.5 to 0.8 mS in a low speed side (refer to FIG. 4 (*b*)).

Effects of the First Embodiment

The ignition device 1 of first embodiment has the secondary current control circuit 30 that receives the input of the secondary current control signal IGa from the ECU 4, and the feedback circuit 10 outputs the control signal for controlling the energization of the primary coil 5 to the energy supply circuit 9 according to the result of comparison between the control value of the secondary current outputted from the secondary current control circuit 30 and the detected value of the secondary current. Further, the ECU 4 obtains the control value of the secondary current according to the engine parameters, and outputs the composed secondary current signal IGa.

Thereby, the secondary current substantially indicating the amount of energy that is supplied into the ignition coil 3 from the energy supply circuit 9 can be controlled in accordance with the operating condition of the engine. Therefore, it is possible to suppress excess or shortage of energy supplied from the energy supply circuit 9 to the ignition coil 3 from occurring in the ignition device 1 that performs the continuous spark discharge.

Further, the signal lines L1 to L3 of the secondary current control signal IGa are provided separately from the signal lines of the discharge continuation signal IGw.

Accordingly, it is possible to simplify the circuit construction, and it is possible to set the secondary current control signal IGa and the discharge continuation signal IGw independently.

In addition, the secondary current control signal IGa is outputted from the ECU4 using the three signal lines L1 to L3 to the ignition device 1. Then, the secondary current control circuit 30 obtains the control value of the secondary current according to the combination of the potentials of the signal lines L1 to L3.

Thereby, different numerical values for each combination of high/low levels of the signal lines L1 to L3 can be set as a control value of the secondary current. Therefore, it is possible to increase the degree of freedom in selecting the control value of the secondary current.

Second Embodiment

A second embodiment will be described with reference to FIG. 5, FIG. 6 (a) and FIG. 6 (b) mainly on points different from the first embodiment. Note that the same reference numerals as the first embodiment in the second embodiment show the same functions thereof.

Figure 5:
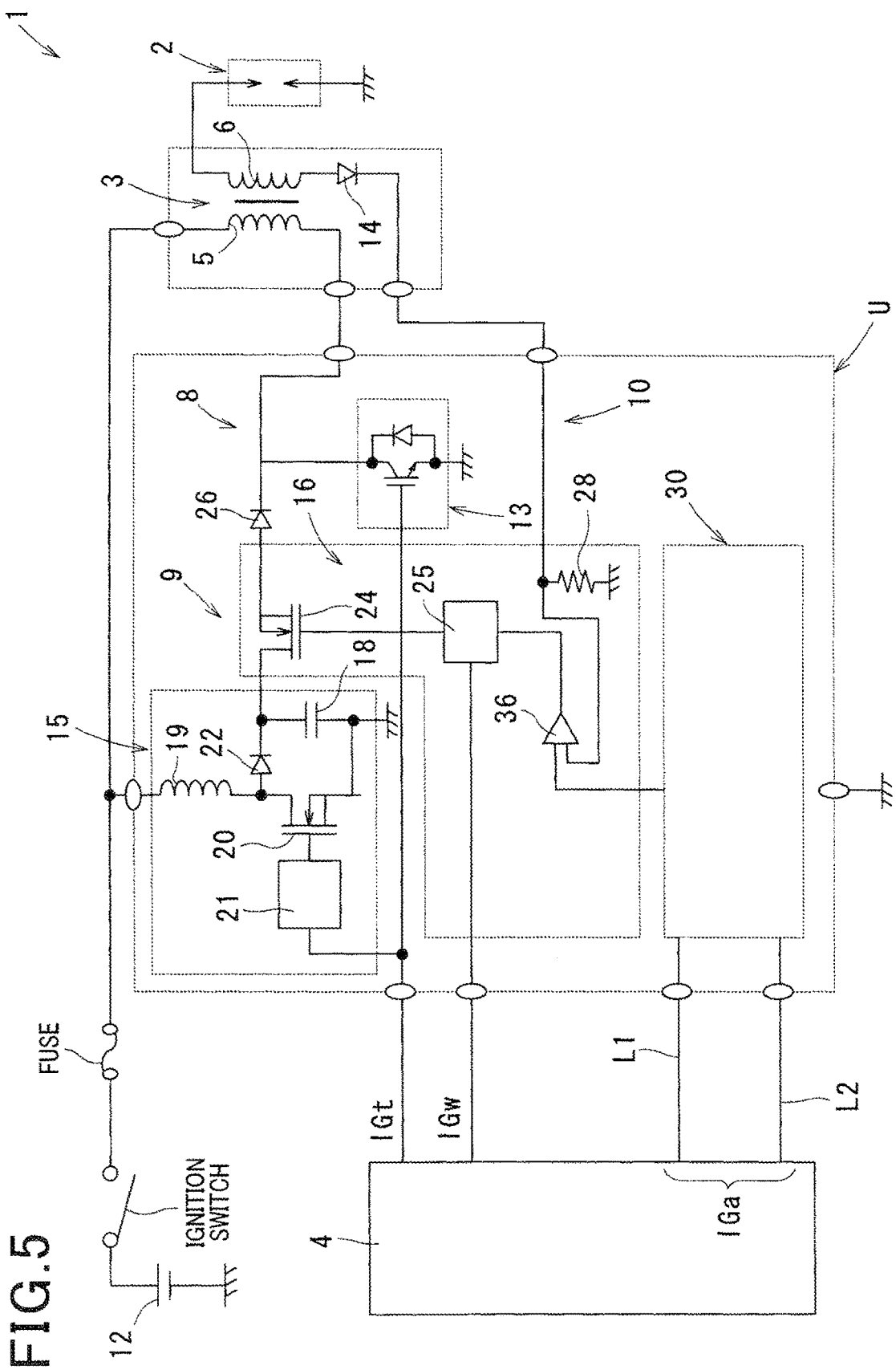
FIG. 5 shows a configuration diagram of an ignition device (second embodiment)

According to an ignition device 1 of the second embodiment, a secondary current signal IGa is outputted from an ECU 4 to the ignition device 1 via two signal lines L1 and L2, as shown in FIG. 5. Further, the ECU 4 sets an aspect of the secondary current signal IGa according to a combination of potentials (high/low) of the signal lines L1 and L2 in the same manner as in the first embodiment.

Figures 6A, 6B:
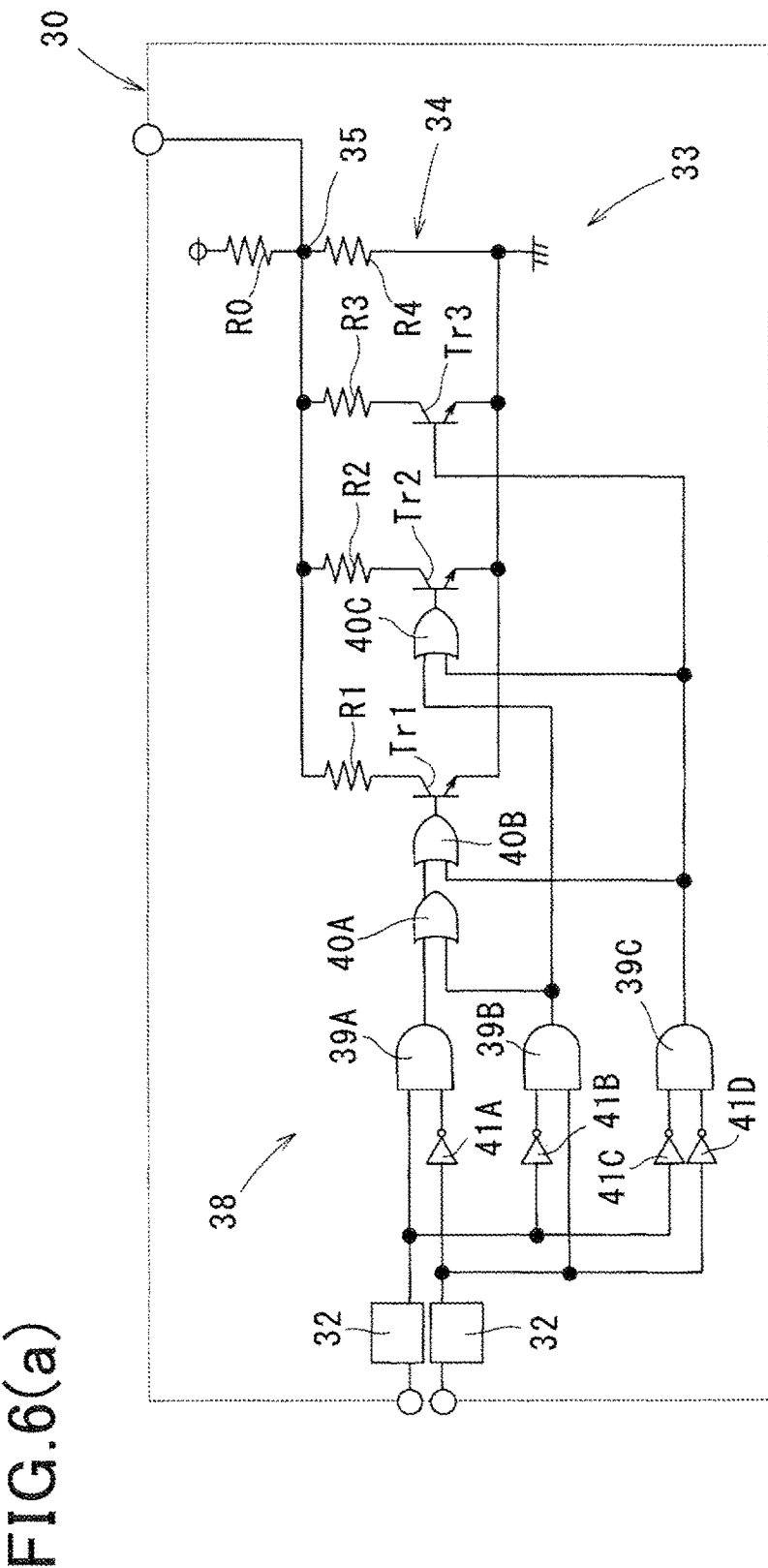
FIG. 6(a) shows a block diagram of a secondary current control circuit (second embodiment)
FIG. 6(b) shows a table illustrating aspects of a secondary current control signal (second embodiment)
Figure 7:
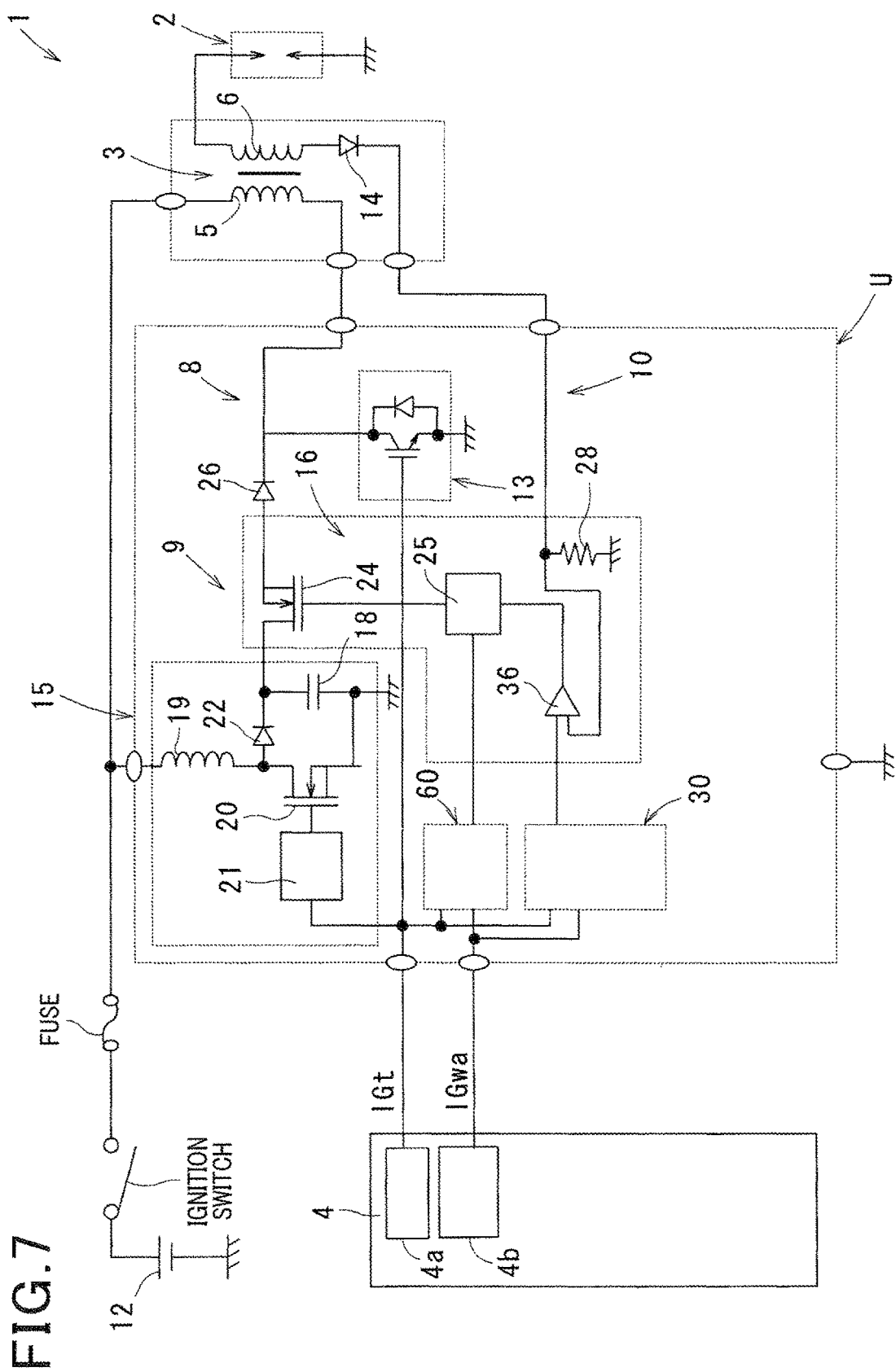
FIG. 7 shows a block diagram of an ignition system (third embodiment)

For example, it is assumed that the ECU 4 sets four numeric values of 200 mA, 150 mA, 100 mA and 50 mA as the control values of the secondary current (refer to FIG. 6(b)). In this case, if 200 mA is selected as a control value of the secondary current, the aspects of the secondary current control signal IGa are assumed to be set to, for example, the signal line L1: high, and the signal line L2: high; if 150 mA is selected, the signal line L1: high, and the signal line L2: low; if 100 mA is selected, the signal line L1: low, and the signal line L2: high; and if 50 mA is selected, the signal line L1: low, and the signal line L2: low.

Further, the number of the waveform shaping sections 32 is two because the number of the signal lines is reduced to three in the first embodiment to two in a secondary current control circuit 30 (refer to FIG. 6 (a)).

Further, although a circuit configuration of a control value output section 33 is the same as that of the first embodiment, a control signal inputted to switching elements Tr 1 to Tr 3 is logically converted high/low levels of the signal lines L1 and L2 unlike the first embodiment.

That is, the secondary current control circuit 30 of the second embodiment has a logic conversion section 38 that logically converts the aspect of the secondary current control signal IGa.

The logic converting section 38, as shown in FIG. 6 (a), is configured to include a three AND circuits 39A to 39C, three OR circuits 40A to 40C, and four NOT circuits 41A to 41D, for example.

First, the AND circuit 39A outputs a logical product of a signal of the signal line L1 and a signal obtained by inverting a signal of the signal line L2 by the NOT circuit 41A. Further, the AND circuit 39B outputs a logical product of a signal obtained by inverting a signal of the signal line L1 by the NOT circuit 41B and a signal of the signal line L2. Furthermore, the AND circuit 39C outputs a logical product of a signal obtained by inverting a signal of the signal line L1 by the NOT circuit 41C and a signal obtained by inverting a signal of the signal line L2 by the NOT circuit 41D.

Next, the OR circuit 40A outputs a logical sum of an output signal of the AND circuit 39A and an output signal of the AND circuit 39B. Further, the OR circuit 40B outputs a logical sum of an output signal of the OR circuit 40A and an output signal of the AND circuit 39C.

Furthermore, the OR circuit 40C outputs a logical sum of an output signal of the AND circuit 39B and an output signal of the AND circuit 39C. Then, the output signal of the OR circuit 40B is inputted to a base of the switching element Tr1, the output signal of the OR circuit 40C is inputted to a base of the switching element Tr2, and the output signal of the AND circuit 39C is inputted to a base of the switching element Tr3.

Accordingly, since a combined resistance of a parallel section 34 changes between four numeric values in accordance with the high/low levels of the signal lines L1 and L2, the potentials at the connection portion 35 also change between the four numeric values in accordance with the high/low levels of the signal lines L1 and L2. Therefore, the secondary current control circuit 30 is able to output the control value of the secondary current selected from among 200 mA, 150 mA, 100 mA, and 50 mA in accordance with the aspects of the secondary current control signals IGa.

Modifications of First and Second Embodiments

Although the secondary current control circuits 30 of the above embodiments receive inputs of the secondary current control signals IGa via two or three signal lines, and obtain the control values of the secondary current by selecting one numeric value among the three or four different numerical values, inputs of the secondary current control signal IGa may be received via more than four signal lines, and the control values of the secondary current may be obtain by selecting one numeric value among five or more different numerical values.

Further, it is also possible to use only one signal line, and in this case, one numerical value can be selected from two numerical values as the control value of the secondary current via the high/low of one signal line. Therefore, if it is possible to sufficiently suppress the excess or shortage of the amount of energy in the continuous spark discharge from occurring when the two numerical values as the control values of the secondary current are prepared, the ignition device 1 can obtain the control value of the secondary current from only one signal line.

Further, the secondary current control circuits 30 of the above embodiments receive inputs of the secondary current control signals IGa as the combinations of logic signals of high/low, the secondary current control signals IGa may be received as analog voltage signals, and an input of the secondary current control signal IGa may be received vis one signal line.

Thus, since the control value of the secondary current is given as sequential numbers, the ignition device 1 is possible to control in accordance with the operating condition of the engine more.

Third Embodiment

A third embodiment will be described with reference to FIG. 7 to FIG. 10 (a) and FIG. 10 (b) mainly on points different from the first embodiment. Note that the same reference numerals as the first embodiment in the third embodiment show the same functions thereof.

In the present embodiment, an ignition device 1 together with an ECU 4 (a control unit of the ignition device 1) is referred to as an ignition system.

In the ignition system of the present embodiment, the ECU 4 is provided with an ignition signal transmission unit 4a and a composite signal transmission unit 4b, which are described below.

The ignition signal transmission unit 4a transmits an ignition signal IGt as a pulse signal to the ignition device 1.

Figure 8:
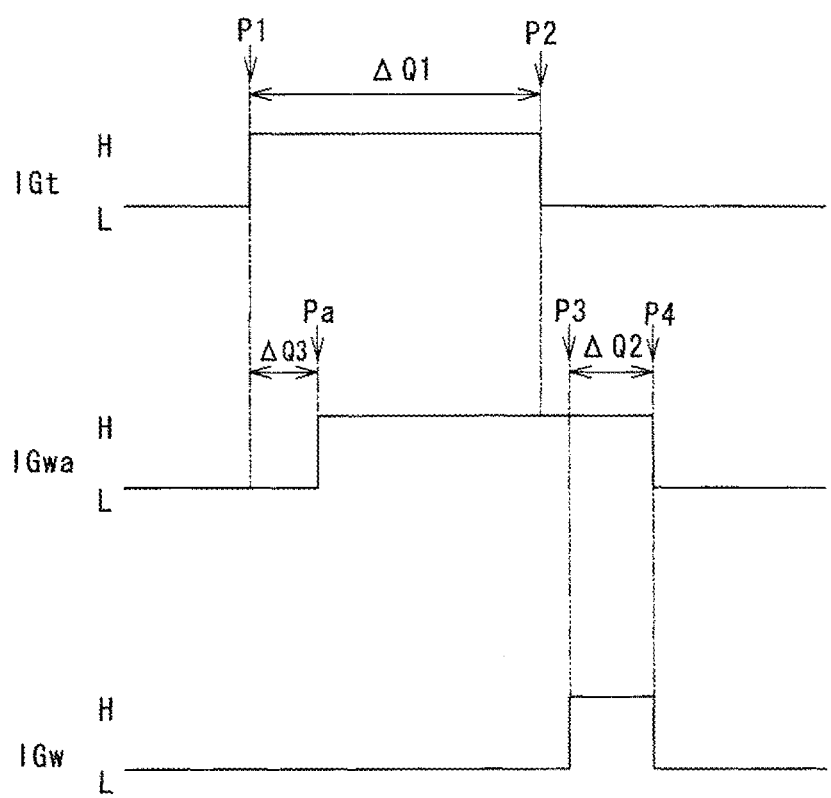
FIG. 8 shows a time chart showing an ignition signal IGt, a composite signal IGwa, and a discharge continuation signal IGw (third embodiment)

As shown in FIG. 8, the ignition signal IGt indicates a start timing t01 of a period to let a primary coil 5 in a main ignition circuit 8 accumulate magnetic energy by a rising timing P1 of a pulse, and indicates an ignition start timing t02 (which is also an end of the period of accumulating the magnetic energy) by a falling timing P2 of the pulse. In other words, a period ΔQ1 in which the ignition signal IGt is high becomes a period where the magnetic energy is being accumulated.

The composite signal transmission unit 4b generates a composite signal IGwa including a discharge continuation signal IGw and a secondary current control signal IGa, and transmits it to the ignition device 1.

That is, the composite signal IGwa is generated in the ECU4 as a signal including the information necessary to drive an energy supply circuit 9 (information that the discharge continuation signal IGw and the secondary current control signal IGa include).

The composite signal IGwa is a pulse signal that rises with a delay from the rising timing P1 of the ignition signal IGt.

The composite signal IGwa indicates the control value of the secondary current by a time difference ΔQ3 between the rising timing Pa of the composite signal IGwa and the rising timing P1 of the ignition signal IGt. That is, the control value of the secondary current is indicated by a phase difference between the ignition signal IGt and composite signal IGwa.

In addition, the composite signal IGwa indicates the period ΔQ2 as a period to continue the continuous spark discharge (time t03 to t04) with a timing P3 after a predetermined time from the falling timing P2 of the ignition signal IGt as a start timing and a falling timing P4 of the composite signal IGwa as an end time.

It should be noted that the timing P3 is generated inside an ignition circuit unit U (an IGw signal extraction circuit 60, for example, which will be described later) based on the timing P2.

Then, in addition to the secondary current control circuit 30, the IGw signal extraction circuit 60 is disposed inside the ignition circuit unit U as a circuit for processing signals from the ECU 4.

The IGw signal extraction circuit 60 receives the composite signal IGwa, extracts the discharge continuation signal IGw (a signal rises at the timing P3, and falls at the timing P4), and transmits it to the supply driver circuit 25.

The secondary current control circuit 30 receives the composite signal IGwa, extracts the secondary current control signal IGa, and outputs the secondary current control value to a comparator 36.

An example of a method for extracting the secondary current control signal IGa from the composite signal IGwa, and outputting the secondary current control value to the comparator 36 will be described in the following.

In the present embodiment, it is an aspect that one value among three current values (100 mA, 150 mA, 200 mA), for example, is selected as a secondary current control value in accordance with an operating condition or the like.

For example, as shown in FIG. 9, the composite signal IGwa ΔQ3 is selected from either one of three patterns (patterns 1 to 3) of 0 ms, 1 ms, and 2 ms. A current control value is different in respective patterns, and information of which one of the patterns is selected is extracted as a secondary current control signal IGa.

In the present embodiment, a secondary current control value in a case of the pattern 1 is 200 mA, a secondary current control value in a case of pattern 2 is 150 mA, and a secondary current control value in a case of the pattern 3 is 100 mA.

Here, the composite signal transmission unit 4b one selects of the patterns 1-3 according to a desired secondary current control value and outputs it to the secondary current control circuit 30.

Then, the secondary current control circuit 30 extracts the information of which one of the patterns is selected as the secondary current control signal IGa.

As shown in FIG. 10, the secondary current control circuit 30 of the present embodiment is configured to include delay circuits 63 and 64, D-type flip-flops 65 and 66, an analog output circuit 67, or the like, for example.

The delay circuits 63 and 64 are connected in parallel, and each receives an input of the ignition signal IGt.

The delay circuit 63 is a circuit to obtain a signal E1 which is an ignition signal IGt being 0.5 ms delayed.

The delay circuit 64 is a circuit to obtain a signal E2 which is an ignition signal IGt being 1.5 ms delayed.

The signal E1 is applied to a D terminal of the D-type flip-flop 65.

The signal E2 is applied to a D terminal of the D-type flip-flop 66.

The composite signals IGwa is applied to respective CK terminals (clock) of the D-type flip-flop 65 and 66.

Thereby, when the composite signal IGwa is in the case of the pattern 1, levels of the signal E1 and the signal E2 at the time of 0 ms are outputted from each of Q terminals of the D-type flip-flops 65 and 66.

That is, the signal F1 outputted from the Q terminal of the D-type flip-flop 65 is low, and the signal F2 outputted from the Q terminal of the D-type flip-flop 66 is low.

Further, when the composite signal IGwa is in the case of the pattern 2, levels of the signal E1 and the signal E2 at the time of 1 ms are outputted from each of the Q terminals of the D-type flip-flops 65 and 66.

That is, the signal F1 outputted from the Q terminal of the D-type flip-flop 65 is high, and the signal F2 outputted from the Q terminal of the D-type flip-flop 66 is low.

Furthermore, when the composite signal IGwa is in the case of the pattern 3, levels of the signal E1 and the signal E2 at the time of 2 ms are outputted from each of the Q terminals of the D-type flip-flops 65 and 66.

That is, the signal F1 outputted from the Q terminal of the D-type flip-flop 65 is high, and the signal F2 outputted from the Q terminal of the D-type flip-flop 66 is high.

The analog output circuit 67 is composed of resistors 70 to 72 connected in parallel, switching elements Tra and Trb respectively connected in series with the resistors 70 and 71, and the like.

The switching element Tra is turned ON when a signal F1 from the D-type flip-flop 65 is high output, and is turned OFF when the signal F1 is low output.

The switching element Trb is turned ON when a signal F2 from the D-type flip-flop 66 is high output, and is turned OFF when the signal F2 is low output.

Resistance values of the resistors 70 to 72 are set so as to provide an analog output of 200 mA when both the switching element Tra and the switching element Trb are OFF, 150 mA when only the switching element Tra is ON, and 100 mA when both the switching element Tra and the switching element Trb are ON.

Therefore, the secondary current control signal IGa, which is a control signal for selecting one current value from the three current values and outputting to the energy supply circuit 11, is extracted as signals F1 and F2, and the actual secondary current control value is outputted from the signals F1 to F2 via the analog output circuit 67.

The circuit configuration using the D-type flip-flops 65 and 66 mentioned above is an example of a circuit for extracting the secondary current control signal IGa from the composite signal IGwa, and is not limited to this circuit configuration.

Functions and Effects of Third Embodiment

A signal line for transmitting an ignition signal IGt, a signal line for transmitting a discharge continuation signal IGw, and a signal line for transmitting a secondary current control signal IGa are required as signal lines between the ECU4 and the ignition device 1 per cylinder in the first and second embodiment.

However, according to the present embodiment, the discharge continuation signal IGw and the secondary current control signal IGa can be transmitted in one signal line. That is, it is possible to reduce the number of signal lines between the ECU 4 and the ignition device 1.

Further, in the present embodiment, the control value of the secondary current is indicated by the time difference ΔQ3 between the rising timing Pa of the composite signal IGwa and the rising timing P1 of the ignition signal IGt. In other words, the secondary current control value is indicated in the vicinity of the start time of the period to accumulate the magnetic energy.

According to this, the vicinity of the start time of the period to accumulate the magnetic energy is not affected by the ignition noise due to discharge, it becomes easy to read the secondary current control value.

Fourth Embodiment

Figure 12:
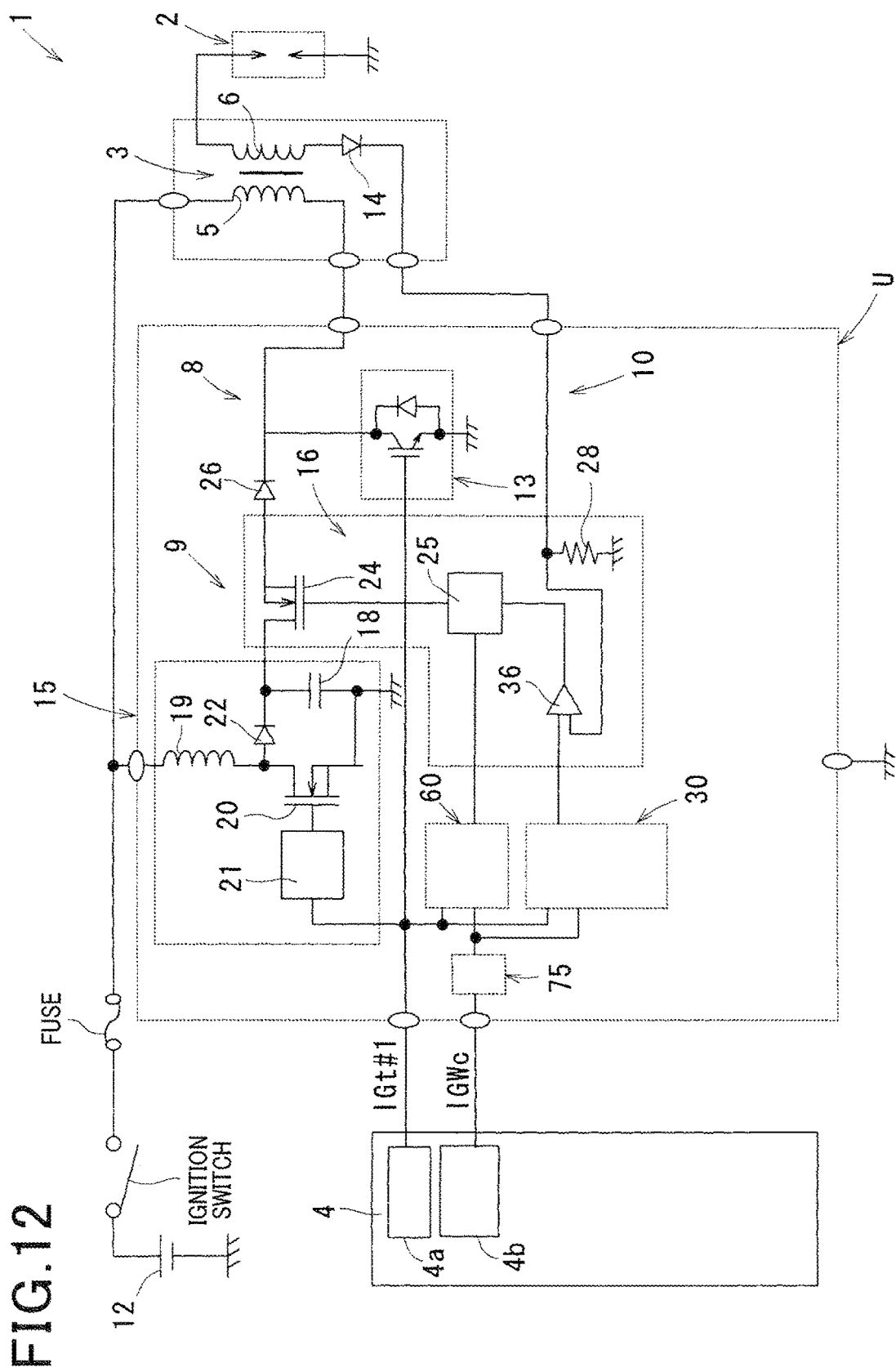
FIG. 12 shows a block diagram of the ignition system (fourth embodiment)

A fourth embodiment will be described with reference to FIG. 11 to FIG. 13 mainly on points different from the first embodiment. Note that the same reference numerals as the first embodiment in the fourth embodiment show the same functions thereof.

In the present embodiment, a composite signal transmission unit 4b multiplexes composite signals IGwa for each cylinder and transmits the signals of all cylinders to an ignition device 1.

An engine of the present embodiment is a four-cylinder engine. Here, a signal of a first cylinder is given #1, a signal of a second cylinder is given #2, a signal of a third cylinder is given #3, and a signal of a fourth cylinder is given #4.

An ECU4 transmits a composite signal IGwa#1-4 of each cylinder and the multiplexed signal IGWc obtained by multiplexing the signals of all cylinders to the ignition device 1.

Figure 13:
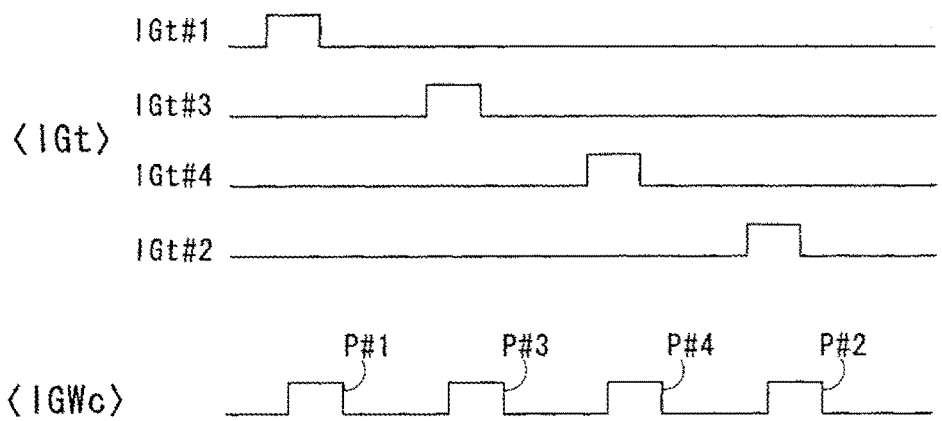
FIG. 13 shows a time chart of an ignition signal IGt and a composite signal IGwa (fourth embodiment)
Figure 14:
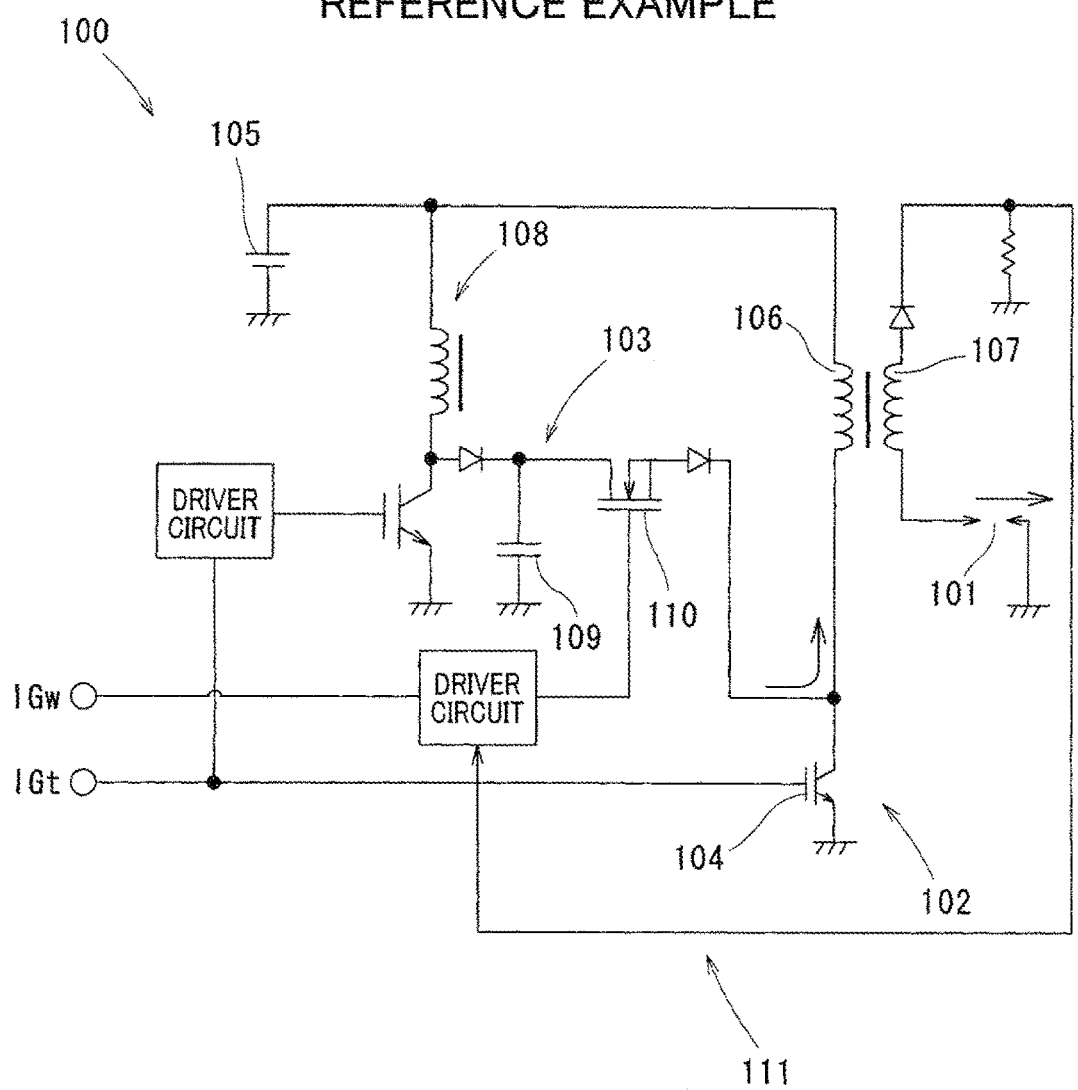
FIG. 14 shows a block diagram of an ignition device (reference example).

That is, as shown in FIG. 13, the multiplexed signal IGWc is a signal that multiplexes pulses of the composite signals IGwa#1-4 of each cylinder in a time division, and sequentially outputs pulses P#1-4 corresponding to the composite signal IGwa#1-4 for each cylinder in accordance with the output order of an ignition signal IGt#1-4 by one signal line. Then, the multiplexed signal IGFc is transmitted using one signal line.

It should be noted that the ignition signal transmission unit 4a generates an ignition signal IGt for each cylinder, and transmits the ignition signals IGt #1-4 to the ignition device 1 in separate signal lines (refer to FIG. 11).

The multiplexed signal IGWc is processed by a multiple signal processing unit 75 provided in the ignition device 1, and is divided into the composite signals IGwa#1-4 for each cylinder.

The multiple signal processing unit 75 may be provided on the ignition circuit unit U of each cylinder, or may be provided in a controller including the ignition circuit unit U for all the cylinders as a common circuit for the ignition circuit unit U of each cylinder in an upstream side thereof.

The multiple signal processing unit 75 extracts the composite signals IGwa#1-4 of each cylinder from the multiplexed signal IGWc, and transmits the composite signals IGwa#1-4 of each cylinder to the secondary current control circuit 30 and the IGw signal extraction circuit 60.

An example of a method of extracting the composite signals IGwa#1-4 of each cylinder from the multiplexed signal IGWc will easily be described by using an extraction of a multiplexed signal IGwa#1 as an example.

For example, a timer pulse that high-outputs for a predetermined period of time from the rising of the ignition signal IGt#1 is generated, and a pulse P#1 corresponding to the composite signal IGwa#1 by a logical product of the timer pulse and multiplexed signal IGWc is extracted.

Note that the signal processing in the secondary current control circuit 30 and the IGw signal extracting circuit 60 is the same as in the third embodiment.

Functions and Effects of Fourth Embodiment

Since the composite signal IGwa is generated in the ECU 4 for each cylinder and transmitted to the ignition device 1 in the third embodiment, the same number of signal lines as the number of cylinders is required to transmit the composite signals IGwa. However, in the present embodiment, since it is possible to transmit for all cylinders in one signal line, the signal lines between the ECU 4 and the ignition device 1 can be further reduced more than in the case of the third embodiment.

Note that although the signals of all cylinders have been multiplexed in the present embodiment, signals may be multiplexed at least for two cylinders or more. It should be noted that the combination of signals to be multiplexed may be a combination at an ignition phase where an ignition intervals can be obtained widely (for example, the first cylinder and the fourth cylinder, etc.).

Modifications

Although an example of applying the ignition device 1 of the present invention to a gasoline engine is described in the above embodiments, since an ignitability of the fuel (specifically an air-fuel mixture) can be improved by the continuous spark discharge, it may be applied to engines using ethanol fuel or mixed fuel. Further, the ignitability by continuous spark discharge can also be improved even if applied to an engine that may uses inferior fuel.

Although an example of applying the ignition device 1 of the present invention to an engine capable of the lean burn operation is described in the above embodiments, since the ignitability by continuous spark discharge can be improved even in different combustion conditions from lean burn, it is not limited to the application to the engine capable of lean-burn, but may be applied to an engine that does not perform lean burn.

Although an example of applying the ignition device 1 of the present invention in a direct injection engine that injects fuel directly into a combustion chamber is described in the above embodiments, it may be applied to a port-injection type engine to which fuel is injected into an intake upstream side of an intake valve (into an intake port).

Although an example of applying the ignition device 1 of the present invention in an engine that actively produces swirling flow (the tumble flow or swirl flow, etc.) of the gas mixture in the cylinder is disclosed in the above embodiments, it may be applied to an engine that does not have swirling flow control means (a tumble flow control valve or a swirl flow control valve, etc.).

REFERENCE SIGNS LIST

- 1: ignition device
- 2: spark plug
- 3: ignition coil
- 4: ECU (control unit)
- 5,106: primary coil
- 6,107: secondary coil
- 8,102: main ignition circuit
- 9,103: energy supply circuit
- 10,111: feedback circuit
- 30: secondary current control circuit
- IGa: secondary current control signal

The invention claimed is:

1. An ignition device for an internal combustion engine comprising:
   a main ignition circuit to generate a spark discharge to a spark plug by controlling energization of a primary coil of an ignition coil;
   an energy supply circuit that continues a spark discharge started by an operation of the main ignition circuit by controlling the energization of the primary coil during the spark discharge started by the operation of the main ignition circuit to supply a secondary current in the same direction as a main ignition continuously in a secondary coil of the ignition coil;
   a feedback circuit that detects the secondary current and feeds back the secondary current to the energy supply circuit; and
   a secondary current control circuit that receives a secondary current control signal indicating a control value of the secondary current from a separate control unit, wherein,
   the control value of the secondary current is obtained in accordance with engine parameters indicating an operating condition of the internal combustion engine; and
   the feedback circuit outputs the control signal for controlling the energization of the primary coil to the energy supply circuit according to a result of comparison between the control value of the secondary current outputted from the secondary current control circuit and a detected value of the secondary current.

2. The ignition device according to claim 1, wherein, a discharge continuation signal for operating the energy supply circuit is outputted from the control unit to the ignition device;
   the energy supply circuit controls the energization of the primary coil during the discharge continuation signal is being inputted; and
   the secondary current control signal and the discharge continuation signal are respectively outputted from the control unit to the ignition device by separate signal lines.

3. The ignition device according to claim 2, wherein, the secondary current control signal is outputted from the control unit to the ignition device by using a signal line; and
   the secondary current control circuit obtains the control value of the secondary current according to a potential of the signal line.

4. The ignition device according to claim 1, wherein, the secondary current control signal is outputted from the control unit to the ignition device by using a signal line; and
   the secondary current control circuit obtains the control value of the secondary current according to a potential of the signal line.

5. The ignition device according to claim 1, wherein, the secondary current control signal is indicated as an analog voltage signal.

6. An ignition system including the ignition device according to claim 1 and a control unit for controlling the ignition device, the control unit comprising:
   an ignition signal transmission unit that transmits an ignition signal as a pulse signal for operating a main ignition circuit to the ignition device; and
   a composite signal transmission unit that generates a composite signal including a discharge continuation signal and a secondary current control signal, and transmits it to the ignition device; wherein,
   the composite signal is a pulse signal that rises simultaneously with or with a delay from a rising timing of the ignition signal;
   the composite signal indicates a control value of a secondary current by a time difference between a rising timing of the composite signal and the rising timing of the ignition signal; and
   a period with a timing after a predetermined time from a falling timing of the ignition signal as a start timing and a falling timing of the composite signal as an end time is indicated as a period to continue the continuous spark discharge.

7. The ignition system according to claim 6, wherein, the composite signal transmitting section multiplexes the composite signal of at least two cylinders of each cylinder and transmits it to the ignition device.

* * * * *